(12) United States Patent
Shirakawa et al.

(10) Patent No.: US 6,732,009 B2
(45) Date of Patent: May 4, 2004

(54) MACHINING ERROR CORRECTION METHOD ADAPTED FOR NUMERICALLY CONTROLLED MACHINE TOOL AND GRINDING MACHINE USING THE SAME

(75) Inventors: Yuuji Shirakawa, Yamanashi-ken (JP); Takuya Yamagata, Yamanashi-ken (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 10/405,813

(22) Filed: Apr. 3, 2003

(65) Prior Publication Data

US 2003/0204287 A1 Oct. 30, 2003

(30) Foreign Application Priority Data

Apr. 26, 2002 (JP) ........................................ 2002-127193

(51) Int. Cl.⁷ ..................... G05B 19/402; G05B 19/19
(52) U.S. Cl. ...................................... 700/193; 700/164
(58) Field of Search ........................... 700/28, 32, 33, 700/164, 173, 174, 177, 192, 193; 702/182

(56) References Cited

U.S. PATENT DOCUMENTS

| | | | | |
|---|---|---|---|---|
| 4,382,215 A | * | 5/1983 | Barlow et al. | 318/568 |
| 5,297,055 A | * | 3/1994 | Johnstone | 364/474.37 |
| 5,335,454 A | * | 8/1994 | Ilek et al. | 51/165.75 |
| 5,477,118 A | * | 12/1995 | Yoneda et al. | 318/569 |
| 5,871,391 A | * | 2/1999 | Pryor | 451/9 |
| 6,385,502 B1 | * | 5/2002 | Takagi et al. | 700/169 |

FOREIGN PATENT DOCUMENTS

JP 53-38876 A1 4/1978

OTHER PUBLICATIONS

The Modern Machine Shop, "Doubling Accuracy Of Manual Grinding Machines With CNC Wheel Dressers" Jun. 1, 1997, Gardner Publications, Inc.*
Carius, "The Grindability Of Powder Metal Materials Using CBN Abrasives" Dec. 15, 2001, Gardner Publications, Inc.*

* cited by examiner

*Primary Examiner*—Leo Picard
*Assistant Examiner*—Sean P. Shechtman
(74) *Attorney, Agent, or Firm*—Rader, Fishman & Grauer PLLC

(57) ABSTRACT

A machining error correction method corrects error in machining of a work by a tool. The method is adapted for a machine tool that includes a numerical control unit in which a movement amount of the tool is programmed and a tool moving unit that is driven by an instruction signal sent from the numerical control unit and feeds the tool to the work fixed on a work table. The method includes the steps of moving the tool from a program origin to a measurement point provided separately from the program origin by giving a predetermined measurement movement amount to the tool moving unit from the numerical control unit; measuring a positional deviation amount between the measurement position and a tool position after the movement is finished; and correcting a machining movement amount of the tool moving unit using the positional deviation amount when the work is machined.

8 Claims, 7 Drawing Sheets

MACHINING ERROR CORRECTION METHOD ADAPTED FOR NUMERICALLY CONTROLLED MACHINE TOOL AND GRINDING MACHINE USING THE SAME

FIELD OF THE INVENTION AND RELATED ART STATEMENT

The present invention relates to a numerically controlled machine tool, such as an NC milling machine or an NC grinding machine, which performs machining of a work by moving a tool based on a programmed movement amount, and in particular to a machining error correction method for eliminating an error in machining of a work resulting from an error in movement of a tool.

Conventionally, as a machine tool that performs machining of a work using various kinds of tools, there has been known a so-called numerically controlled (NC) machine tool that automatically machines a work by controlling movement of the tools in accordance with a numeric data inputted in advance. FIG. 10 shows an example of a vertical NC grinding machine that performs grinding machining on works W using a grinding wheel T. This grinding machine is provided with a work table 101 for fixing the works W on a base 100, a gate-shaped column 102 is provided so as to stand on the base 100 while straddling the work table 101, and the work table 101 is adapted so as to be capable of moving on the base 100 in an X-axis direction (right-left direction on the paper plane of FIG. 10). Also, the grinding wheel T that performs the grinding machining on the works W is held by a spindle 103 and this spindle 103, is held by a wheel spindle stock 104 functioning as a tool moving unit that is capable of moving in a U-axis direction (top-bottom direction) and a Y-axis direction (depth direction on the paper plane of FIG. 10). Further, this wheel spindle stock 104 is mounted on one of side surfaces of the column 102.

The movements of the wheel spindle stock 104 and the work table 101 are controlled by a numerical control unit composed of a computer. A tool path, a machining speed, and the like are programmed in advance in this numerical control unit. In general, the tool path is shown by a coordinate system where one point within a moving range of the wheel spindle stock is set as a program origin, and is defined using distances from the program origin in the U-axis direction and the Y-axis direction. Accordingly, when machining is started, the wheel spindle stock 104 and the work table 101 are driven in accordance with an instruction from the numerical control unit. Therefore, the grinding wheel T held by the spindle 103 is moved from the program origin to a predetermined position at a predetermined speed and the work table 101 is also moved, so that the works W are machined.

Essentially, in this NC machine tool, if the wheel spindle stock and the work table are moved as instructed by inputs into the numerical control unit, it is possible to machine the works with a high degree of precision without causing any dimension error. If the temperature in a plant changes, however, the lead of a ball screw that is responsible for the movement of the wheel spindle stock fluctuates, and the column and base supporting the wheel spindle stock also expand or shrink, albeit only slightly. Also, the spindle holding the grinding wheel rotates at a high speed, so that in the case where machining is continuously performed, this results in a situation where its main axis expands in an axis direction due to heat generated by a motor or a bearing. Consequently, even if the wheel spindle stock is moved from the program origin by an instructed movement amount, there occurs a situation where the position of the tool with reference to the works slightly differs from an intended position, which means that it is difficult to machine the works to predetermined dimensions with precision.

In view of this problem, in order to machine a work with a high degree of precision by eliminating environmental fluctuation factors such as those described above, a sizing device has conventionally been used in combination with numeral control. This sizing device compares a machined work with a master piece that has been machined in advance with a high degree of precision, and checks the machined dimensions of the work. For this purpose, the sizing device includes a probe 106 that is brought into contact with corresponding portions of the master piece and the work. In the grinding machine shown in FIG. 10, a sizing device 105 is attached to a side surface of the column 102 on a side opposite to the wheel spindle stock 104, and the above-mentioned probe 106 is held by the column 102 through a moving unit 107 that is similar to the wheel spindle stock 104. On the other hand, a master piece 108 is fixed at a position that is virtually the same as that of the works W on the work table 101. During machining using this sizing device 105, first, the probe 106 is brought into contact with the master piece 108 and a position of this contact is stored in a memory of the numerical control unit. Next, the probe 106 is brought into contact with each work W that has been machined, and a position of this contact is compared with the contact position of the master piece 108 stored in the memory. A difference found as a result of this comparison is a machining error of the work W with reference to the master piece 108. Therefore, if the machining of the work W is performed by moving the wheel spindle stock 104 by the detected difference, it is possible to machine the work W with the same degree of precision as the master piece 108.

However, a long period of time is required to measure the machining accuracy of each work using the sizing device, which becomes a factor for reduction in production efficiency. Also, due to the cost of the sizing device itself, the necessity to produce a master piece with a high degree of precision in advance, and the like, there is a problem in that the introduction cost of the sizing device itself also rises.

Also, in the case of the grinding machine that uses the grinding wheel, it is required to modify the shape of the grinding wheel T using a dresser 109 and to perform generation of an abrasive grain cutting edge each time a predetermined number of works have been machined. In addition, the position accuracy of the grinding wheel T with reference to the dresser 109 is of extreme importance. In the case where the position accuracy of the grinding wheel T with reference to the dresser 109 is low, this results in a situation where the dresser 109 that is essentially provided to modify the shape of a grindstone actually destroys the grindstone shape, which becomes a factor for a degradation in the machining accuracy of the work W.

As can been seen from the above description, the above-described sizing device is designed to enhance the accuracy in machining of a work through relative comparison of the work with the master piece, which means that the sizing device does not guarantee the positional accuracy of movement of the grinding wheel itself and serves no effect with respect to a relation between the dresser and the grinding wheel. Accordingly, in the case of a grinding machine, there is a problem in that even in the case where this grinding machine is equipped with a sizing device, the accuracy in machining of a work tends to be degraded.

Also, in order to shorten a machining time taken to perform grinding machining and to realize a reduction in production cost, it is desired to use a cubic boron nitride grindstone (also referred to herein as a CBN grindstone) that uses abrasive grains such as alumina-based grains that are harder than conventional abrasive grains. If the accuracy in modifying the shape of a grindstone by a dresser is poor, however, this results in a situation where more abrasive grains are scraped off by a single dressing operation. Therefore, there occurs a problem in that the life span of the grindstone is shortened and it becomes impossible to introduce the CBN grindstone that is superior in machining efficiency but is high-priced.

OBJECT AND SUMMARY OF THE INVENTION

The present invention has been made in the light of the problems described above, and an object of the present invention is to provide a machining error correction method for use in a numerically controlled machine tool, with which a fluctuation in an actual feed amount of a tool resulting from an influence of a fluctuation in the environmental temperature, frictional heat at the time of machining, and the like can be eliminated so that it is possible to machine a work with a high degree of precision without performing a comparison between the work and a master using a sizing device.

Also, another object of the present invention is to provide a grinding machine that is capable of, when the shape of a grindstone is to be modified using a dresser, performing the modification of the grindstone shape with a high degree of precision by eliminating a fluctuation in an actual feed amount of a tool with reference to this dresser and is therefore capable of machining a work with a high degree of precision and with high production efficiency.

That is, the present invention provides a machining error correction method for correcting an error in machining of a work by a tool, which is adapted for a machine tool that includes a numerical control unit in which a movement amount of the tool is programmed, and a tool moving unit that is driven by an instruction signal sent from the numerical control unit and feeds the tool to the work fixed on a work table, the method being characterized by including: moving the tool from a program origin to a measurement point provided separately from the program origin by giving a predetermined measurement movement amount to the tool moving unit from the numerical control unit; measuring a positional deviation amount between the measurement position and a tool position after the movement is finished; and correcting a machining movement amount, which is to be given to the tool moving unit, using the positional deviation amount when the work is machined.

Essentially, in order to move a tool from a program origin to a position at which machining of a work is to be performed, it is sufficient that the coordinates of the work machining position with reference to the program origin are given to a tool moving unit as a machining movement amount. However, due to an error in the feeding by the tool moving unit or expansion or shrinkage of a column supporting the tool moving unit which may result from a fluctuation in the environmental temperature or the like, it is impossible to set the tool with precision with reference to the work machining position by merely giving the coordinates of the work machining position as a machining movement amount. In view of this problem, according to the present invention, a position which is herein referred to as a measurement point is provided separately from the program origin, and when the tool is moved by giving the coordinates of the measurement point to the tool moving unit as a measurement movement amount, whether or not this tool is properly set at the measurement point is measured using displacement amount sensors. Then, in the case where a positional deviation amount of the tool with reference to the measurement point is detected by the displacement amount sensors, the machining movement amount itself used at the time of work machining is corrected using the positional deviation amount described above.

According to this method of the present invention, even if, for instance, the feed amount of the tool moving unit fluctuates due to a fluctuation in the environmental temperature or the expansion or shrinkage of the column supporting the tool moving unit, it is possible to eliminate an influence thereof, which makes it possible to set the tool with reference to the work machining position with precision. As a result, it becomes unnecessary to compare the dimensions of the works that have been machined with those of a master piece one by one using a sizing device, which makes it possible to enhance production efficiency.

Also, if the method of the present invention is applied to a grinding machine and this grinding machine is adapted so that a dress movement amount used in moving a tool from a program origin to set it at a dressing position is corrected using the positional deviation amount, even if, for instance, the feed amount of a tool moving unit fluctuates due to a fluctuation in the environmental temperature, it is possible to position a grindstone with reference to a dresser with precision. Therefore, it becomes possible to perform modification of the shape of the grindstone with a high degree of precision, which allows a work to be machined with a high degree of precision. Also, since it is possible to perform the modification of the grindstone shape with a high degree of precision, it becomes possible to minimize the amount of abrasive grains scraped off by a single dressing operation so that the life span of the grindstone is elongated, which even makes it possible to realize an improvement in production efficiency by introducing a CBN grindstone that excels in machining efficiency.

There is no problem in adapting the aforementioned method of the present invention such that after a positional deviation amount of a tool is measured at a measurement point, the machining movement amount and/or the dress movement amount of the tool set in a numerical control unit is always corrected without fail using this positional deviation amount. However, it is not necessary to correct the machining movement amount even in the case where the detected positional deviation amount is smaller than a feed amount error that inherently exists in the tool moving unit. Therefore, it is preferable that the machining movement amount and/or the dress movement amount be corrected only in the case where the measured positional deviation amount is equal to or larger than a predetermined value.

Also, in order to detect the positional deviation amount of the tool set at the measurement point, it is possible to use various kinds of sensors, such as a contact type sensor or a non-contact type sensor, which are capable of detecting a positional deviation of the tool with reference to the measurement point. However, the detection accuracy of this displacement amount is directly reflected in the machining accuracy of a work, so that it is preferable that there is used a sensor that is capable of detecting a positional deviation of 1 μm or less. Also, it is preferable to use a non-contact type sensor in view of the fact that its detection accuracy does not degrade even after the measurement is repeatedly performed for a long period of time.

Further, according to the method of the present invention, there is no problem in correcting a machining movement amount using a measured positional deviation amount as it is. However, in the case where a measurement error exists in this positional deviation amount, there may be conceived situations in which a fluctuation in a feed amount of a tool conversely increases. Accordingly, in addition to that a measuring movement amount for moving a tool to set it at a measurement point is corrected using the measured positional deviation amount, it is preferable that the tool is moved and set at the measurement point again using a post-correction measurement movement amount, thereby confirming whether the positional deviation amount measured at the measurement point again is equal to or less than the predetermined value.

Still further, it is most preferable that such correction of a machining movement amount is performed each time machining of a work is performed. However, considering a time loss resulting from the necessity to perform the measurement of a tool positional deviation amount at the measurement point, it is preferable that the correction is performed only in the case where there is a high probability that the tool movement accuracy has been significantly impaired, such as when the tool has been replaced or when a predetermined number of works have been machined. Also, in the case where a machine tool is activated after a long intermission, for instance, it is preferable that the correction of a machining movement amount is performed after the tool positional deviation amount is measured, in order to eliminate an influence exerted by a fluctuation in the environmental temperature.

DETAILED DESCRIPTION OF THE PREFERRED EMBODIMENT

Hereinafter, the machining error correction method for use in a numerically controlled machine tool of the present invention will be described in detail with reference to the accompanying drawings.

Figure 1:
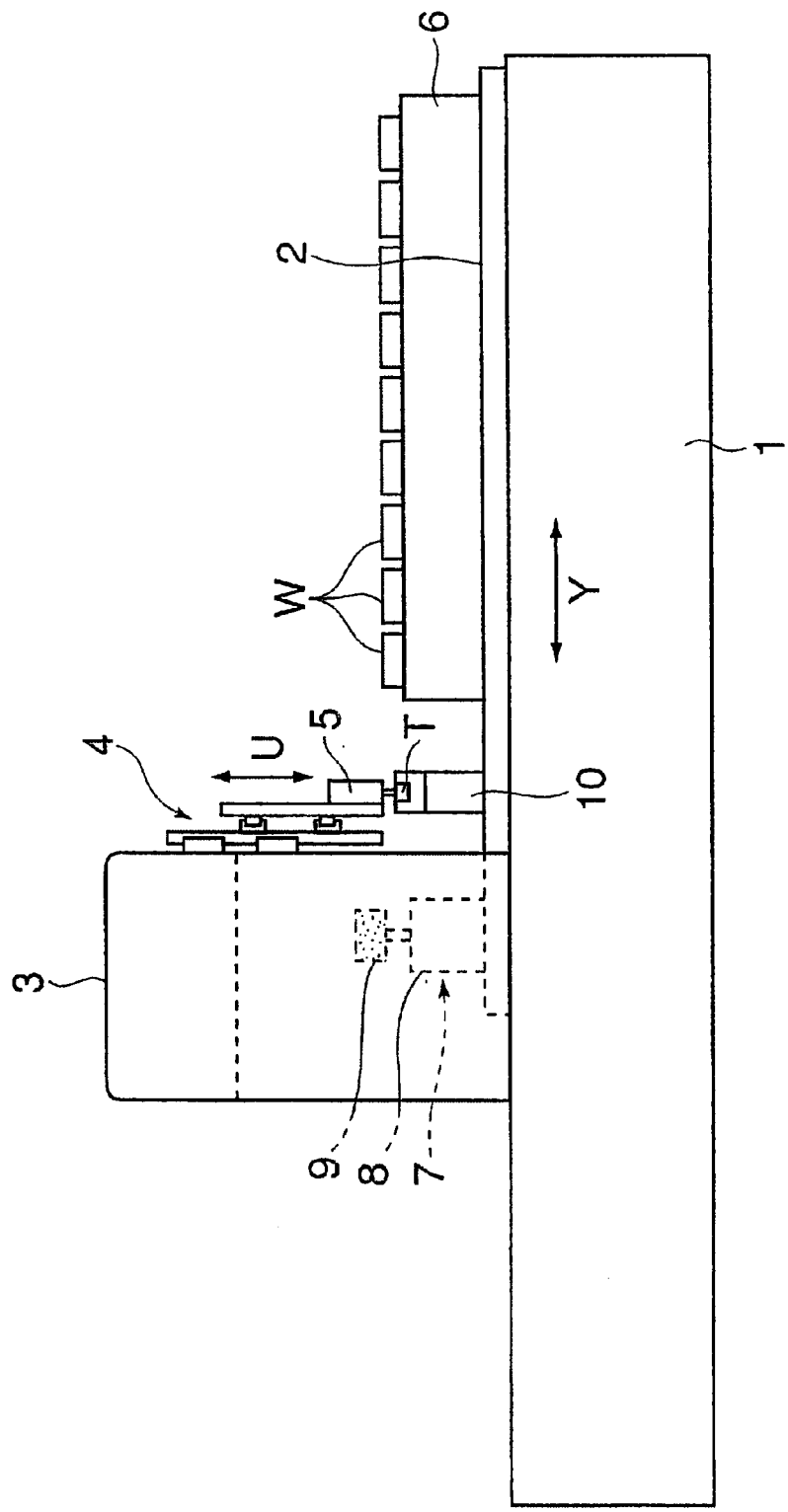
FIG. 1 is a side view showing an embodiment of a grinding machine to which the method of the present invention is applied.

FIG. 1 shows an example of a numerically controlled grinding machine to which there is applied the machining error correction method of the present invention. This grinding machine includes a base unit 1 that is installed on a floor surface of a plant, a work table 2 that is capable of moving in a reciprocating manner on the base unit 1 in a Y-axis direction (right-left direction on the paper plane of FIG. 1), a column 3 that is provided so as to straddle the work table 2, a wheel spindle stock (tool moving unit) 4 that is provided on a side surface of the column 3 and is capable of moving in a U-axis direction and an X-axis direction, and a spindle 5 that is supported by the wheel spindle stock 4 and has a rotation main axis that is set so as to coincide with the U axis direction. Also, this grinding machine is constructed so as to perform grinding machining of works W fixed on the work table 2 using a grinding wheel (tool) T attached on the rotation main axis of the spindle 5.

On the work table 2 described above, there is provided a fixing base 6 for holding the works W thereon. Also, the work table 2 is adapted so as to be moved in a reciprocating manner in the Y-axis direction by a combination of a motor contained in the base 1 and a feed screw (not shown). The tool T is moved by the wheel spindle stock 4 in the U-axis direction and the X-axis direction by predetermined amounts and the work table 2 is moved from this state, whereby the grinding wheel T penetrates into the works W. Accordingly, by controlling the rotation angle and rotation speed of the motor, it is possible to freely set the penetration amount of the grinding wheel T into the work W and a grinding speed. Note that, in the example shown in FIG. 1, a construction is shown in which a plurality of works W are fixed on the fixing base 6 and grinding machining is performed by moving the work table 2 in the X-axis direction, so that the grinding wheel T machines these works W one after another. However, there is no problem even if this work table 2 is of a type such that only one work W is fixed thereon at a time.

Also, the wheel spindle stock 4 has a construction in which a mono-axis table that is capable of freely moving in a reciprocating manner in the U-axis direction and a mono-axis table that is capable of freely moving in a reciprocating manner in the X-axis direction are stacked, and the spindle 5 is fixed on a top table that moves in the X-axis direction. Like the work table 2 described above, each mono-axis table is driven in a corresponding direction by a combination of a motor and a feed screw and, by controlling the rotation angles (rotation amounts) of two motors, it is possible to move the grinding wheel T mounted on the spindle 5 to an arbitrary position from a program origin within a U-X coordinate plane and set the grinding wheel T at the arbitrary position. Here, the program origin means an origin with reference to which the moving position of the grinding wheel T and the moving position of the work table are numerically controlled within a U-X-Y space.

On the other hand, a dresser 7 for modifying the shape of a grindstone is provided on the work table 2. This dresser 7 is a rotary dresser that bears a diamond wheel 9 using a spindle 8, has a rotation main axis that is set so as to coincide with the U-axis direction, and is disposed at a position spaced apart from the work fixing base 6 in the Y-axis direction. Consequently, by moving the work table 2 in the Y-axis direction, it is possible to set the grinding wheel T at a machining position for a work or at a dressing position by the rotary dresser 7, as appropriate.

Figure 2:
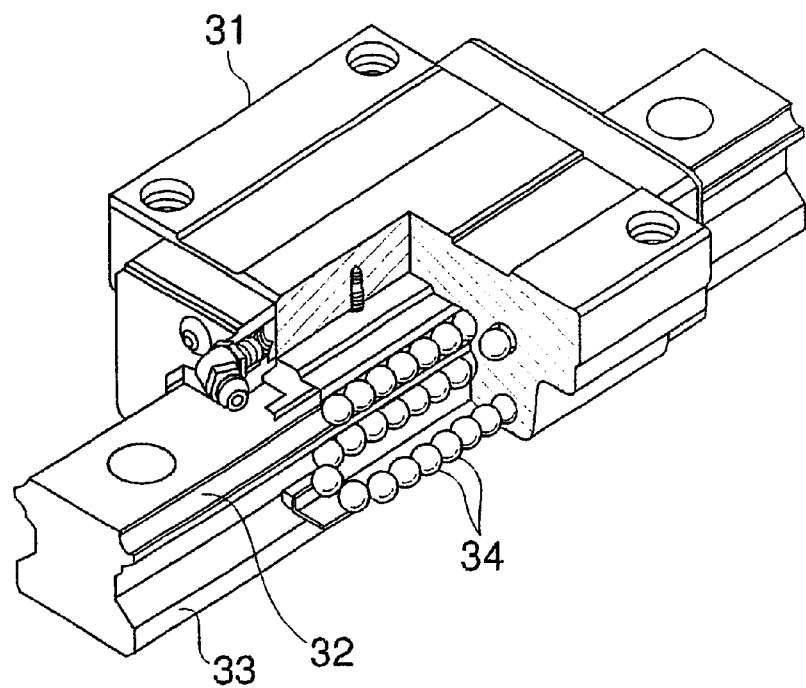
FIG. 2 shows an example of a linear guiding apparatus to be machined by the grinding machine according to the embodiment.
Figure 3:
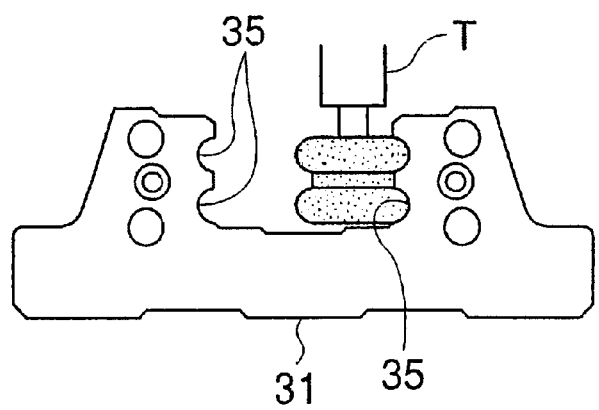
FIG. 3 is a cross-sectional view showing how a sliding block of the linear guiding apparatus is subjected to grinding machining using a form grinding wheel.

This grinding machine is used, for instance, to perform grinding machining of a sliding block 31 of a linear guiding apparatus 30 shown in FIG. 2. This linear guiding apparatus 30 is constructed of a track rail 33 for which a ball rolling surface 32 is formed along a lengthwise direction, and a sliding block 31 which is provided with a large number of balls 34 that roll on the ball rolling surface 32 and which moves on the track rail 33 in accordance with the rolling of these balls 34. In the example shown in the figure, the sliding block 31 is formed so as to have a channel shape having a concave groove at its center and is combined with the track rail 33 so as to straddle the track rail 33. As shown in FIG. 3, on the inside surface of the sliding block 31 that has been formed so as to have a channel shape, two ball rolling surfaces 35, on which the balls 34 roll, are formed on either side thereof (meaning that four ball rolling surfaces 35 are formed in total). The grinding machine described above is used to perform grinding machining of these ball rolling surfaces 35 of the sliding block 31. In order to enhance the efficiency of the grinding machining and to ensure the accuracy of the positional relations among the plurality of ball rolling surfaces, these four ball rolling surfaces 35 are ground so that two ball rolling surfaces positioned on either side of the concave groove are ground at the same time. Therefore, the grinding wheel T is formed as a form grinding wheel to which the shapes of the two ball rolling surfaces 35 and 35 on one side are transferred. By performing grinding machining by having this grinding wheel T contact one of the side surfaces of the concave groove of the sliding block 31, it is possible to finish the two ball rolling surfaces 35 and 35 with a high degree of precision.

Essentially, in this grinding machine, in the case where a predetermined rotation amount is given to the motor constituting the wheel spindle stock 4, the grinding wheel T is moved in the U-axis direction and the X-axis direction with precision so that the grinding wheel T is positioned at an intended position within the U-X axis plane with a high degree of precision. However, if the environmental temperature in a plant in which this grinding machine is installed fluctuates, expansion or shrinkage occurs, albeit slightly, in the feed screw that is responsible for the movement of the wheel spindle stock 4 in the U-axis direction and the X-axis direction. As a result, the lead of the feed screw fluctuates, so that even in the case where a predetermined rotation amount is given to the motor, there occurs a situation where the grinding wheel T is set at a position that contains an error with reference to the intended position.

Also, the spindle 5 holding the grinding wheel T rotates at a high speed during machining, so that heat energy generated by the motor or frictional heat of a bearing is gradually accumulated in the main axis of the spindle during the machining of the works W. Therefore, the main axis also suffers from thermal expansion, albeit slightly. Further, the column 3 and the base 1 also expand or shrink due to a fluctuation in the environmental temperature. In particular, a coolant fluid used during grinding machining adheres to a side surface of the column 3 on which the grinding wheel T is provided, so that there is a fear that the column 3 itself suffers from thermal deformation. Accordingly, due to the reasons described above as well, a position to which the grinding wheel T is moved tends to contain an error.

If the position to which the grinding wheel is moved contains an error as described above, the machining accuracy of the work W is impaired. In addition, in the grinding machine, the shape of the grinding wheel is modified using the dresser 7, so that if the moving position of the grinding wheel T contains an error, the positioning of the grinding wheel T with reference to the dresser 7 also contains an error, which results in a situation where the shape of the grindstone is conversely impaired by the dressing that is essentially performed for the purpose of modifying the grindstone shape. Further, if grinding of the works W is performed using the grinding wheel T whose grindstone shape has been impaired, this results in a situation where the accuracy in machining of the work W is impaired. In particular, in the case where a form grinding wheel is used as the grinding wheel T as described above, this problem becomes more serious.

Figure 4:
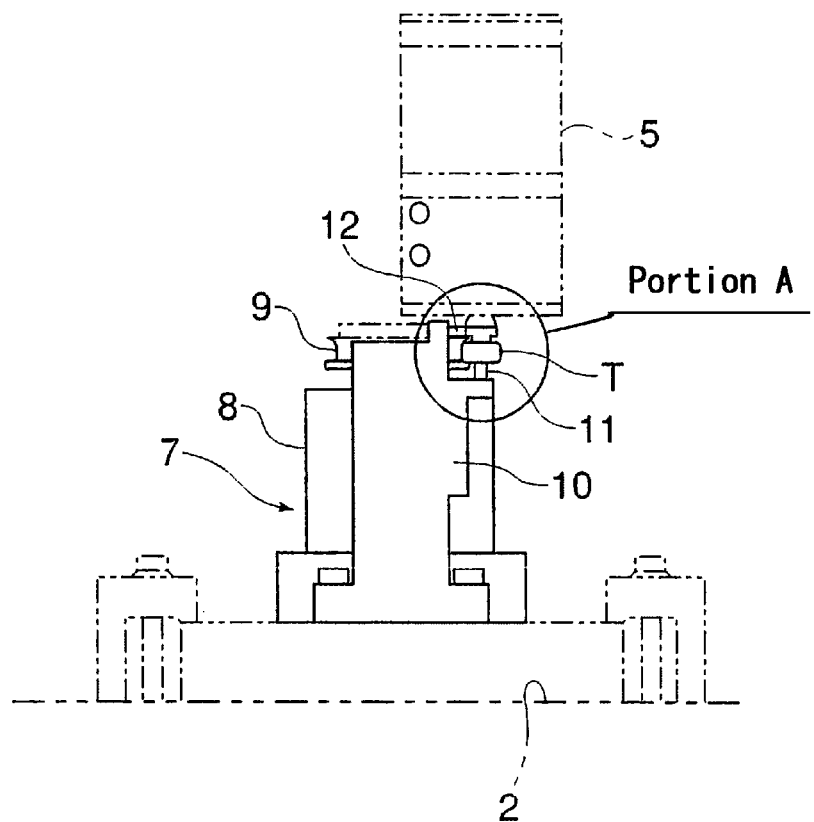
FIG. 4 is a front view showing a sensor base on which displacement amount sensors are mounted.

In view of this problem, in the grinding machine of this embodiment, a point which is herein referred to as a "measurement point" is provided separately from the program origin of the wheel spindle stock 4 and the grinding wheel T is moved from the program origin to the measurement point and is set at the measurement point at each predetermined timing such as during each interval between work machining operations. Then, at the measurement point, there is detected a positional deviation amount of the grinding wheel T with reference to the measurement point. This measurement point is set at a substantially midpoint position between the works W on the work fixing base 6 and the dresser 7. In addition, as shown in FIG. 4, there is obtained a construction where one pair of sensors 11 and 12 are held on the work table 2 through a sensor base 10. Note that FIG. 4 is a view obtained by observing the measurement point from the work fixing base 6 along the X-axis direction, and the dresser 7 is positioned behind the supporting base 10 in the figure.

Figure 5:
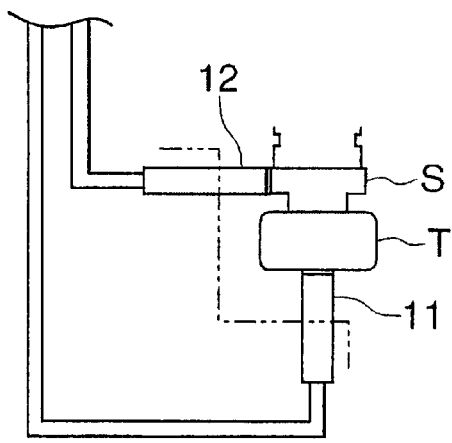
FIG. 5 is an enlarged view of a portion A of FIG. 4.

As shown in FIG. 5, one pair of displacement amount sensors 11 and 12 are attached to the sensor base 10. These displacement amount sensors 11 and 12 are each an eddy-current proximity sensor. One (sensor 11) of the displacement amount sensors is disposed so as to face upward in the U-axis direction in order to detect a positional deviation amount of the grinding wheel T in the U-axis direction, while the other (sensor 12) of the displacement amount sensors is disposed so as to be directed in the X-axis direction in order to detect a positional deviation amount of the grinding wheel T in the X-axis direction. When the grinding wheel T is set at the measurement point, the former, that is, the U-axis direction sensor 11 opposes the tip of a metallic rotation shaft S of the grinding wheel T while the latter, that is, the X-axis direction sensor 12 opposes the peripheral surface of the metallic rotation shaft S of the grinding wheel T. Then, how proximate is the rotation shaft S to each of the sensors 11 and 12 is detected with a resolution of not larger than 1 μm.

Figure 6:
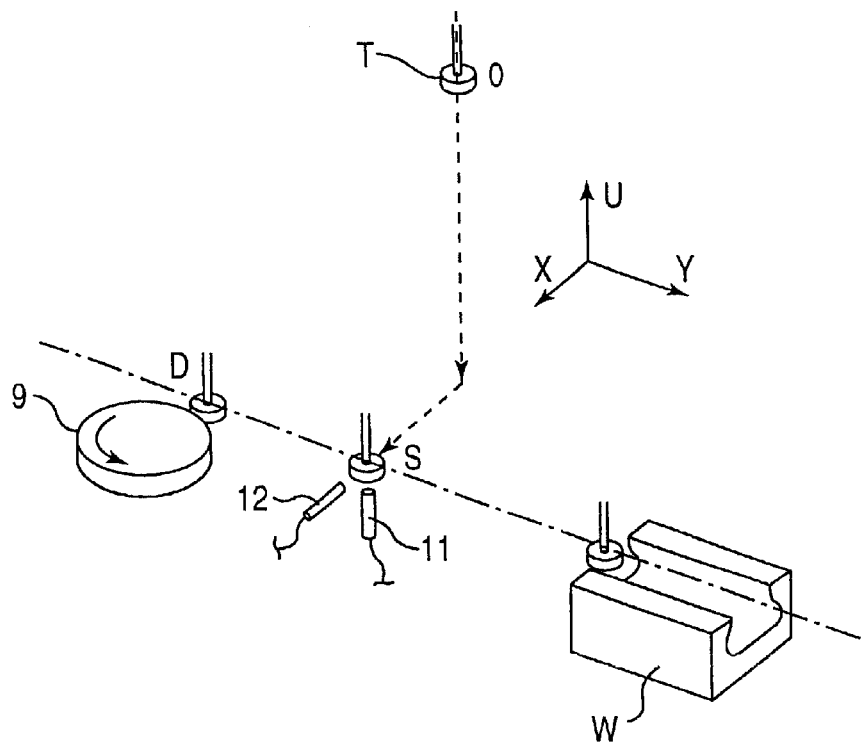
FIG. 6 shows a positional relation among a program origin, a measurement point, and a dressing position within a U-X-Y space.

FIG. 6 shows a positional relation among the measurement point S, the program origin O, the dressing position D, and the machining start position of the work W in the U-X-Y space. The work table 2 is provided with a sensor (not shown) for detecting a moving position in the Y-axis direction and a detection signal from this sensor is picked up, thereby making it possible to stop the work table 2 with precision at a position at which the measurement point coincides with the moving plane of the grinding wheel T. Accordingly, when the grinding wheel T is moved within the U-X plane by driving the wheel spindle stock 4 under a state where the work table 2 is stopped at this position (hereinafter referred to as the "table origin") it is possible to set the grinding wheel T at the measurement point.

The dressing position D, at which the grinding wheel T is subjected to shape modification, coincides with the measurement point within the U-X plane and, when the work table 2 is moved in the Y-axis direction under a state where the grinding wheel T is set at the measurement point, it is possible to set the grinding wheel T at the dressing position D. Also, the diamond wheel 9 of the dresser 7 is provided so as to contact a Y-axis direction line connecting the measurement point S and the dressing position D. Therefore, so long as the grinding wheel T is moved and set at the measurement point in a correct manner, it is possible to correctly set the grinding wheel T at the dressing position merely by moving the work table 2 in the Y-axis direction. Thus it is possible to perform the modification of the shape of the grinding wheel T with a high degree of precision merely by adjusting the penetration amount of the grinding wheel T with reference to the X-axis direction.

In addition, the works W are also positioned on the Y-axis direction line connecting the measurement point S and the dressing position D, so that if the positional deviation amount of the grinding wheel T with reference to the measurement point S is eliminated, the grinding wheel T can be made to approach the work W without any error by moving the work table 2 in the Y-axis direction.

Figure 7:
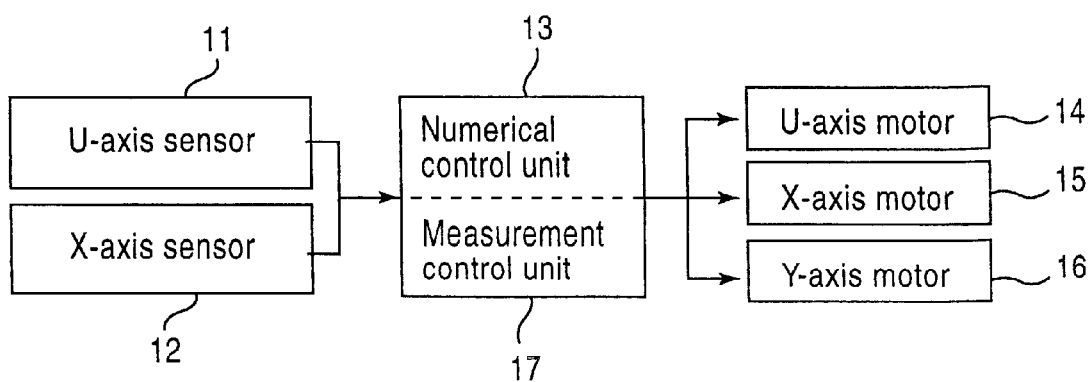
FIG. 7 is a block diagram showing a control system of a wheel spindle stock and a work table in the grinding machine of the embodiment.

FIG. 7 is a block diagram showing a control system of the wheel spindle stock 4 and the work table 2 in this grinding machine. This control system includes a numerical control unit 13 constructed from a computer system. In this numerical control unit 13, the position to which the grinding wheel T is moved at the time of work machining is programmed as a coordinate position within the U-X plane, that is, as movement amounts in the U-axis direction and the X-axis direction with reference to the program origin, and a movement amount of the work table 2 in the Y-axis direction is also programmed. Also, this numerical control unit 13 sends drive control signals to a motor (U-axis motor) 14 for moving the grinding wheel T in the U-axis direction, a motor (X-axis motor) 15 for moving the grinding wheel T in the X-axis direction, and a motor (Y-axis motor) 16 for moving the work table T in the Y-axis direction, thereby controlling the rotation speeds and rotation amounts of these motors. Accordingly, when machining is started, the rotations of the U-axis motor 14, the X-axis motor 15, and the Y-axis motor 16 are controlled based on a control program inputted into the numerical control unit 13 in advance, the wheel spindle stock 4 moves and sets the grinding wheel T at a predetermined machining start position, and a predetermined feed amount is given to the work table 2. As a result of these operations, the grinding wheel T penetrates into the works W.

Also, in order to detect a positional deviation amount of the grinding wheel T with reference to the measurement point using the displacement amount sensors 11 and 12 described above, the grinding machine of this embodiment includes a measurement control unit 17 for moving the grinding wheel T to set it at the measurement point at each predetermined timing such as during each interval between work machining operations. This measurement control unit 17 is realized by a computer system that is the same as that of the numerical control unit 13 described above, and controls the U-axis motor, the X-axis motor, and the Y-axis motor by executing a measurement program stored in advance, thereby setting the grinding wheel T at the measurement point. Also, this measurement control unit 17 is adapted to fetch a positional deviation amount of the grinding wheel T measured by the displacement amount sensors 11 and 12, to correct the movement amount of the grinding wheel T at the time of machining of the works W, which is stored in the numerical control unit 13 (that is, a machining movement amount), using this positional deviation amount, and to rewrite the stored machining movement amount with a corrected movement amount.

Figure 8:
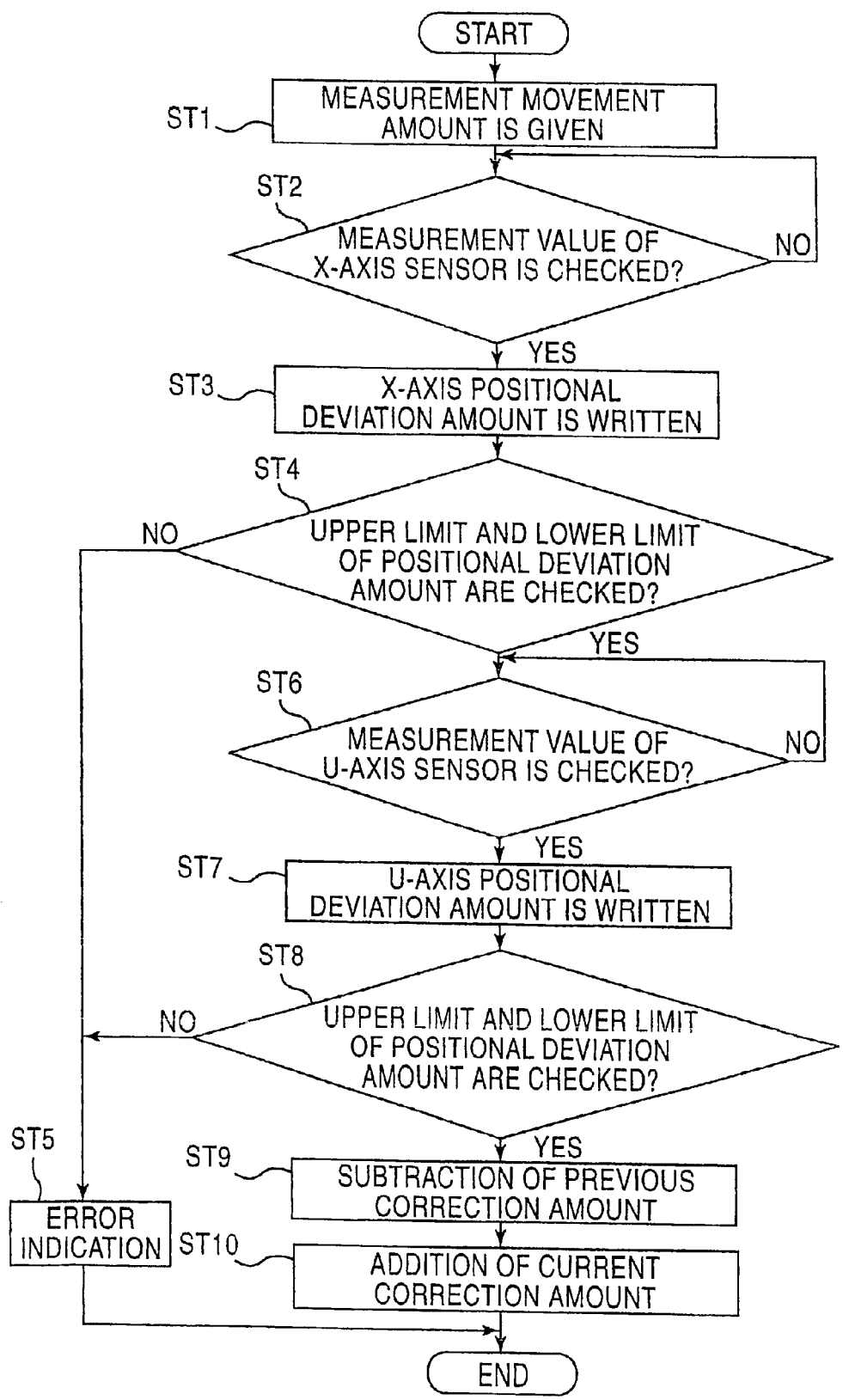
FIG. 8 is a flowchart showing an example of a measurement program.

FIG. 8 is a flowchart showing a flow of the measurement program described above. This measurement program is automatically executed, with its trigger being a case where there is a high probability that an error has occurred in the amount of feeding of the grinding wheel T by the wheel spindle stock 4 during an interval between the previous work machining and the next work machining, for example when the machine has been stopped for a long period of time, when the grinding wheel T has been replaced, or when a large number of works W have been continuously machined. Also, in order to perform the shape modification of the grinding wheel T using the dresser 7 with a high degree of precision, this measurement program is executed without fail before the start of the dressing of the grinding wheel T.

When this measurement program is executed, the measurement control unit 17 described above sends a drive signal to the Y-axis motor 16, thereby setting the work table 2 at the table origin. In addition, the measurement control unit 17 reads the coordinates of the measurement point S stored in the memory and gives the read coordinates to the X-axis motor 14 and the U-axis motor 15 as a measurement movement amount (ST1). If there exists no error in the amount of feeding of the grinding wheel T by the wheel spindle stock 4, the grinding wheel T is moved from the program origin so that the grinding wheel T can be set at the measurement point with precision as a result of these operations. Next, the measurement control unit 17 checks the measurement value of the X-axis sensor 12 and measures how much the grinding wheel T is displaced in the X-axis direction (ST2) from the measurement point. Then, this value is stored in the memory as a positional deviation amount in the X-axis direction (ST3). Also, the measurement control unit checks whether the measured positional deviation amount is larger than a predetermined value (ST4). In the case where it is judged that the measured positional deviation amount is larger than the predetermined value, it is conceived that there has occurred a fault in the machine itself or an abnormality in the control system. Therefore, an error indication is made through a user interface such as a liquid crystal panel (ST5), and the measurement program is ended. On the other hand, if it is judged that the measured positional deviation amount in the X-axis direction is equal to or less than the predetermined value, the measurement control unit 17 next checks the measurement value of the U-axis sensor 11 and measures how much the grinding wheel T is displaced from the measurement point in the U-axis direction (ST6). Then, the measurement control unit 17 stores this value in the memory as a positional deviation amount in the U-axis direction (ST7). The measurement control unit also checks whether the measured positional deviation amount is larger than a predetermined value (ST8). In the case where it is judged that the measured positional deviation amount is larger than the predetermined value, it is likewise conceived that there has occurred a fault in the machine itself or an abnormality in the control system. Therefore, an error indication is made through a user interface such as a liquid crystal panel (ST5), and the measuring program is ended.

On the other hand, if it is judged that the measured positional deviation amount in the U-axis direction is equal to or less than the predetermined value, the measurement control unit 17 next adds the measured positional deviation amounts in the X-axis direction and the U-axis direction to the machining movement amounts that are to be given to the U-axis motor 14 and the X-axis motor 15 during the work machining, thereby performing correction of the machining movement amounts (ST10). Here, the positional deviation amount to be added contains a positive/negative sign. Also, if the measurement program has already been executed and the initial machining movement amount has been corrected by the previous execution of the measurement program, the measurement control unit 17 reads the positional deviation amount measured and stored in the memory at the time of the previous execution of the measurement program and subtracts this read positional deviation amount from the machining movement amount applied to the work machining. Following this, the measurement control unit 17 performs addition of the positional deviation amount measured by the current execution of the measurement program. In this manner, there is performed correction of the machining movement amount. Also, in ST9 and ST10, the dress movement amount used at the time of moving the grinding wheel T from the program origin O to set it at the dressing position D is also corrected in a like manner. When the operations described above are finished, the measurement program is ended.

As a result of this processing, during work machining after the execution of the measurement program, the coordinates on the U-X plane are changed by the amounts of feed amount errors present in the wheel spindle stock 4 and, if the grinding wheel T is moved and set using the post-correction machining movement amount or dress movement amount, it becomes possible to position the grinding wheel T with reference to the machining position of the work W or the dressing position D with a high degree of precision. In particular, in this embodiment, it becomes possible to set the grinding wheel T with precision with reference to the dressing position D overlapping the measurement point S in the Y-axis direction, so that it becomes possible to perform shape modification of the grinding wheel T using the rotary dresser 7 with a high degree of precision and to improve the accuracy in machining of the works W. Also, it is possible to position the grinding wheel T with reference to the dressing position D with precision, so that it becomes possible to perform the shape modification of the grinding wheel T with precision while suppressing the penetration amount of the grinding wheel T into the diamond wheel 9. Therefore, the life span of the grindstone is elongated, which even makes it possible to realize an improvement of production efficiency by introducing a high-priced CBN wheel.

Further, such a measurement program as described above can be easily implemented merely by setting for a conventional grinding machine the measurement point O where the displacement amount sensors are provided, and it is thus not required to use a large-scale apparatus such as a sizing device that has been used with the conventional technique. Therefore, there is obtained an advantage that it is possible to improve the accuracy in machining of a work at low cost. Also, it is not required to compare a work that has been machined with a master piece using a sizing device, so that it becomes possible to finish the machining of a work within a short period of time, which also contributes to enhance production efficiency.

Next, there will be described a flowchart shown in FIG. 9 that shows another system of the measurement program. A trigger for starting this measurement program is the same as that in the case of the measurement program shown in FIG. 8. When this measurement program is executed, the measurement control unit 17 sends a drive signal to the Y-axis motor 16 and sets the work table 2 at the table origin. In addition, the measurement control unit 17 reads the coordinates of the measurement point S stored in the memory and gives the read coordinates to the X-axis motor 14 and the U-axis motor 15 as a measurement movement amount (ST11). Also, an initial movement amount that has been given, that is, the coordinates along the U axis and the X axis stored as the coordinates of the measurement point S, are stored in the memory as measurement position coordinates C (ST12). Also in this flowchart, if there exists no error in the amount of feeding of the grinding wheel T by the wheel spindle stock 4, the grinding wheel T is moved from the program origin so that the grinding wheel T can be set at the measurement point with precision as a result of these operations.

Next, the measurement control unit 17 checks the measurement value of the X-axis sensor 12 and measures how much the grinding wheel T is displaced from the measurement point in the X-axis direction (ST13). Then, this value is stored in the memory as a positional deviation amount in the X-axis direction (ST14). Also, the measurement control unit checks whether the measured positional deviation amount is larger than a predetermined value (ST15). In the case where it is judged that the measured positional deviation amount is larger than the predetermined value (0.05 mm or more, for instance), it is conceived that there has occurred a fault in the machine itself or an abnormality in the control system. Therefore, an error indication is made through a user interface such as a liquid crystal panel (ST16), and the measurement program is ended. On the other hand, if it is judged that the measured positional deviation amount in the X-axis direction is equal to or less than the predetermined value, the measurement control unit 17 next checks the measurement value of the U-axis sensor 11 and measures how much the grinding wheel T is displaced from the measurement point in the U-axis direction (ST17). Then, the measurement control unit 17 stores the value in the memory as a positional deviation amount in the U-axis direction (ST18). The measurement control unit 17 also checks whether the measured positional deviation amount is larger than a predetermined value (ST19) In the case where it is judged that the measured positional deviation amount is larger than the predetermined value, it is likewise conceived that there has occurred a fault in the machine itself or an abnormality in the control system. Therefore, an error indication is made through a user interface such as a liquid crystal panel (ST16), and the measurement program is ended. This procedure from ST13 to ST 19 is the same as the procedure of the measurement program shown in FIG. 8 from ST2 to ST8.

On the other hand, if it is judged that the measured positional deviation amount in the U-axis direction is equal to or less than the predetermined value, the measurement control unit 17 next checks whether the measured positional deviation amounts in the U-axis direction and the X-axis direction of the grinding wheel T are both equal to or less than a predetermined value (2 $\mu$m, for instance) (ST20). The predetermined value in this case means a positional deviation amount that is so minute that it cannot be eliminated for mechanical structural reasons. Then, in the case where it is judged that the positional deviation amounts are larger than the predetermined value, the measurement movement amount given in ST11 is corrected using the measured positional deviation amounts (ST21) Following this, drive signals are sent to the U-axis motor 14 and the X-axis motor 15 using the corrected measurement movement amounts, thereby moving the grinding wheel T from the program origin to set it at the measurement point again. Next, in completely the same manner as in ST13 to ST19, positional deviation amounts of the grinding wheel T in the X-axis direction and the U-axis direction are measured at the measurement point. When the measurement is finished, it is checked whether the positional deviation amounts obtained as a result of this measurement are both equal to or less than a predetermined value (ST20). In the case where it is judged that the obtained positional deviation amounts are both equal to or less than the predetermined value, the measurement control unit 17 calculates measurement position coordinates d of the grinding wheel T at the time when the last measurement is performed, from the post-correction measurement movement amount used in ST21, and stores the coordinates d in the memory (ST22). Also, in the case where it is judged that at least one of the U-axis positional deviation amount and the X-axis positional deviation amount exceeds the predetermined value in ST20, the processing proceeds to ST21 again. Then, after the measurement movement amount (already corrected at least once) used at the time of the previous measurement is corrected again, the operations in ST13 to ST19 are repeated.

When the measurement position coordinates d are recorded, the measurement control unit 17 reads the first measurement position coordinates c stored in ST12 and calculates a difference between the coordinates c and the coordinates d with reference to the U-axis direction and the X-axis direction (ST23). This difference equates to a positional deviation amount between the measurement coordinates c at which the grinding wheel T is set in accordance with the first measurement movement amount and the measurement point S. As a result, in the next ST24, the measurement control unit 17 corrects the machining movement amount at the time of work machining, which is read from the memory of the numerical control unit 13, using the positional deviation amount calculated in ST23. Further, in ST25, the measurement control unit 17 also corrects a dress movement amount used at the time of moving the grinding wheel from the program origin to set it at the dressing position, using the positional deviation amount described above. When these operations are finished, the measurement program is ended. After this, the grinding machining of the works is performed using the new machining movement amount obtained as a result of the correction, and the dressing of the grinding wheel is performed using the new dress movement amount obtained as a result of the correction.

Figure 9:
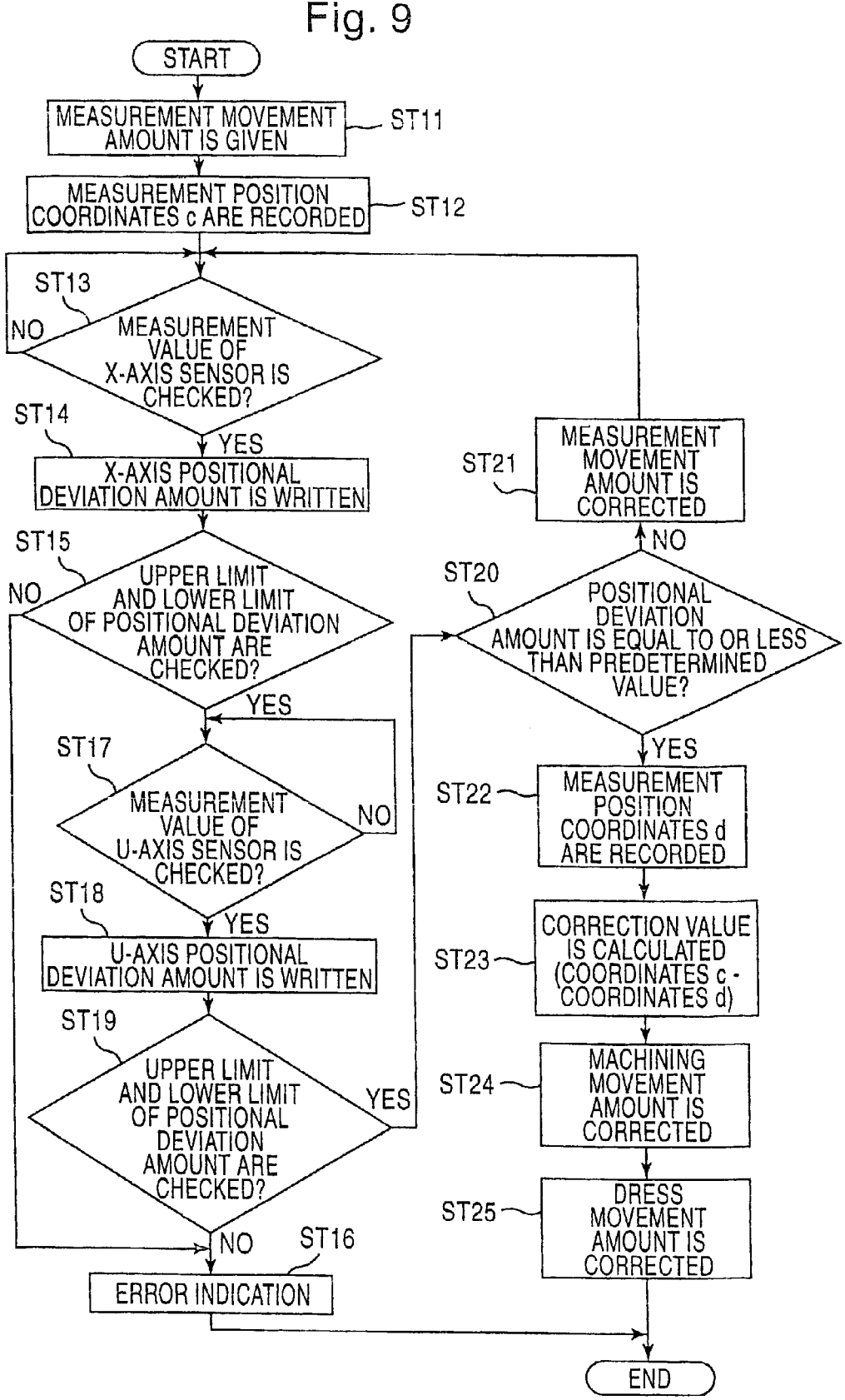
FIG. 9 is a flowchart showing another example of the measurement program.
Figure 10:
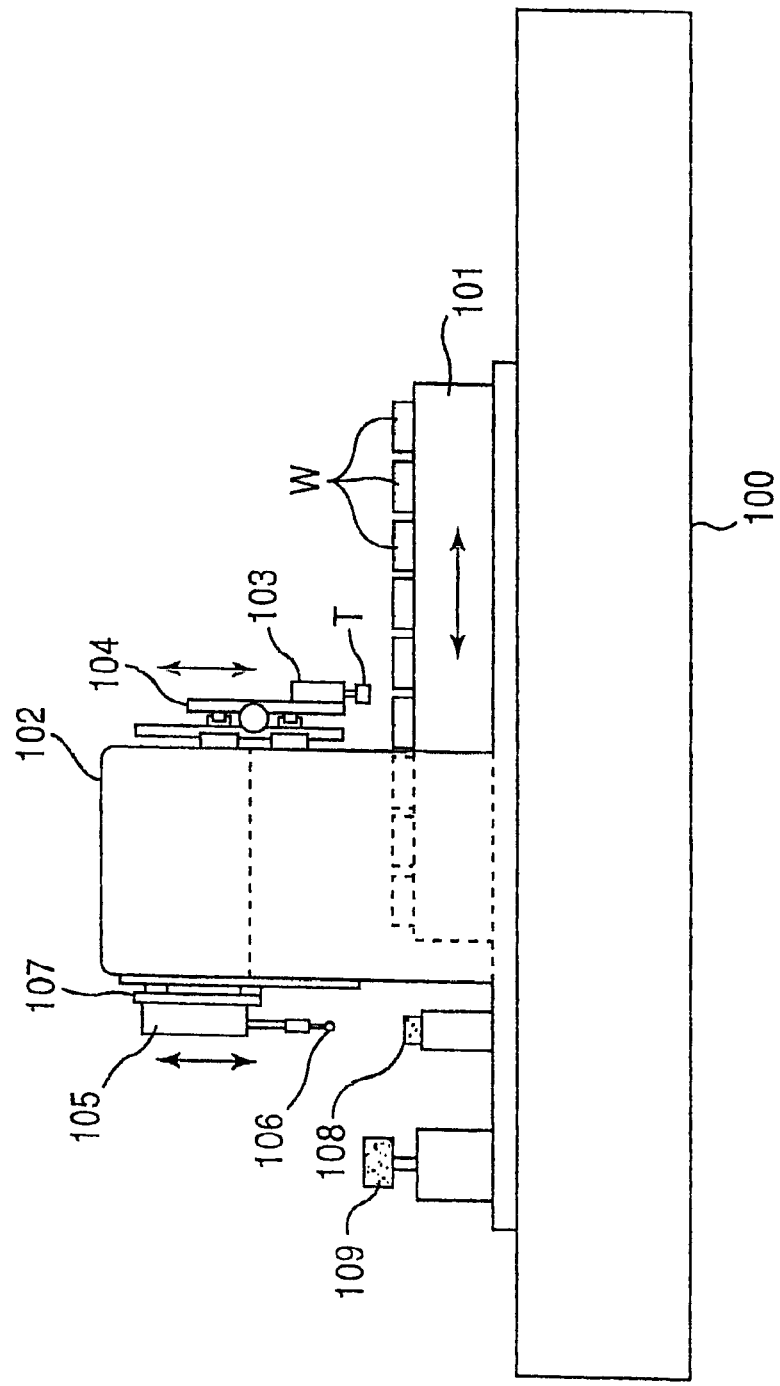
FIG. 10 is a side view showing a conventional grinding machine provided with a sizing device.

Then, with the measurement program shown in this FIG. 9, the measurement movement amount is corrected using the positional deviation amounts measured by the U-axis sensor and the X-axis sensor and the grinding wheel is set at the measurement point again. As a result of these operations, it becomes possible to confirm whether such correction is accurately reflected in the feeding of the grinding wheel by the wheel spindle stock. As a result, as compared with the measurement program shown in FIG. 8, it becomes possible to position the grinding wheel T at the machining position of the work W and the dressing position D with a higher degree of precision and therefore to perform machining of the works with a higher degree of precision.

As described above, with the machining error correction method of the present invention, even if, for instance, the feed amount of a wheel spindle stock varies or a column supporting this wheel spindle stock expands or shrinks due to a fluctuation in the environmental temperature, it is possible to eliminate an influence thereof. Therefore, it becomes possible to machine a work with a high degree of precision without comparing the work with a master using a sizing device, which makes it possible to enhance production efficiency.

Also, if the method of the present invention is applied to a grinding machine and this grinding machine is adapted so that a dress movement amount used to move a tool from a program origin to set it at a dressing position is corrected using the positional deviation amounts described above, even if, for instance, the feed amount of a wheel spindle stock fluctuates due to a fluctuation in the environmental temperature, at the time when the modification of a grindstone shape is performed using a dresser, it becomes possible to eliminate a fluctuation in the actual feed amount of the tool with reference to the dresser so that the grindstone can be accurately positioned with reference to the dresser. As a result, it becomes possible to perform the modification of the grindstone shape with a high degree of precision and therefore to machine a work with a high degree of precision.

What is claimed is:

1. A machining error correction method for correcting an error in machining of a work by a tool, the method being adapted for a machine tool that includes: a numerical control unit in which a movement amount of the tool is programmed; and a tool moving unit that is driven by an instruction signal sent from the numerical control unit and feeds the tool to the work fixed on a work table, the method comprising: moving the tool in two different directions in a single plane from a program origin to a measurement point provided separately from the program origin by giving a predetermined measurement movement amount to the tool moving unit from the numerical control unit; measuring a positional deviation amount between the measurement point and a tool position after the movement is finished; and correcting a machining movement amount, which is to be given to the tool moving unit, using the positional deviation amount when the work is machined;

wherein the machine tool is constructed as a grinding machine in which the tool is a grindstone and includes a dresser for modifying a shape of the grindstone, and wherein when dressing of the grindstone is performed, the numerical control unit corrects a dress movement amount given to the tool moving unit using the positional deviation amount.

2. A machining error correction method according to claim 1 wherein the machining movement amount and/or the dress movement amount is corrected only when the measured positional deviation amount is equal to or larger than a predetermined value.

3. A machining error correction method according to claim 2, wherein if the measured positional deviation amount is equal to or larger than the predetermined value, after the positional deviation amount is measured, the measurement movement amount is corrected using the positional deviation amount, and the tool is moved from the program origin to the measurement point again using the corrected measurement movement amount, and after it is confirmed that a positional deviation amount between the measurement point and a tool position after the movement is finished is equal to or less than the predetermined value, the machining movement amount and/or the dress movement amount is corrected.

4. A machining error correction method according to claim 1 wherein the measurement of the positional deviation amount at the measurement point is performed when at least one of activation of the machine tool, replacement of the tool, and machining of a predetermined number of works is performed.

5. A machining error correction method according to claim 1, wherein one pair of sensors are held on the measurement point, one of the sensors opposes a tip of a rotation shaft of the tool, while the other sensor opposes a peripheral surface of the rotation shaft of the tool.

6. A numerically controlled machine tool comprising:

a work table on which a work that is a machining target is fixed;

a tool moving unit for moving a tool that is a machining tool to set the tool at a position at which the work is to be machined; and a numerical control unit in which a movement amount of the tool moving unit is inputted and programmed and which generates a drive signal for the tool moving unit, wherein a measurement point is provided separately from a program origin within a moving range of the tool, and a measurement control unit is provided which instructs the tool moving unit to move the tool from the program origin so as to be set at the measurement point during each interval between work machining operations, and wherein the measurement control unit measures, by using a displacement amount sensor, a positional deviation amount between the measurement point and the tool which is moved in two different directions in a single plane to be set at the measurement point, and corrects a machining movement amount set in the numerical control unit using the positional deviation amount;

wherein the numerically controlled machine tool is constructed as a grinding machine in which the tool is a grindstone and further comprises a dresser for modifying a shape of the grindstone, wherein in addition to the machining movement amount, the measurement control unit also corrects a dress movement amount, which is set in the numerical control unit using the positional deviation amount.

7. A numerically controlled machine tool according to claim 6, wherein the measurement point is set between the work fixed on the work table and the dresser.

8. A numerically controlled machine tool according to claim 6, wherein one pair of displacement amount sensors are held on the measurement point, one of the displacement amount sensors opposes a tip of a rotation shaft of the tool, while the other displacement amount sensor opposes a peripheral surface of the rotation shaft tool.

* * * * *